United States Patent [19]

Schade

[11] 3,934,047

[45] Jan. 20, 1976

[54] TASTE MODIFIER FOR ARTIFICIAL SWEETENERS

[75] Inventor: Hans Robert Schade, Richland, Mich.

[73] Assignee: General Foods Corporation, White Plains, N.Y.

[22] Filed: Apr. 2, 1974

[21] Appl. No.: 457,283

[52] U.S. Cl. ................. 426/548; 426/590; 426/618
[51] Int. Cl.² ......................................... A23L 1/236
[58] Field of Search ........... 426/212, 213, 217, 342, 426/380, 548, 590, 618

[56] References Cited
UNITED STATES PATENTS

| | | | |
|---|---|---|---|
| 3,492,131 | 1/1970 | Schlatter | 426/212 |
| 3,714,139 | 1/1973 | Schlatter | 426/217 |
| 3,800,046 | 3/1974 | Schlatter | 426/212 X |

OTHER PUBLICATIONS

Winter, Ruth, A Consumer's Dictionary of Food Additives, 1972, pp. 26–27.

Primary Examiner—A. Louis Monacell
Assistant Examiner—Esther L. Massung
Attorney, Agent, or Firm—Bruno P. Struzzi; Daniel J. Donovan; Doris M. Bennett

[57] ABSTRACT

The lingering sweet aftertaste characteristic of certain sweeteners is eliminated by employing therewith a flavor modifying amount of aluminum potassium sulfate, Naringin or a combination thereof.

21 Claims, No Drawings

TASTE MODIFIER FOR ARTIFICIAL SWEETENERS

BACKGROUND OF THE INVENTION

This invention relates to a method of eliminating the lingering sweet aftertaste of certain sweeteners. Specifically, the invention pertains to the combination of dipeptide sweeteners with aluminum potassium sulfate, Naringin, or a mixture thereof, which serves to mask the delayed sweetness intensity of dipeptide sweeteners.

The use of low-calorie sweeteners in place of sugar for the reduction of caloric intake, for medical reasons and for simple dietary reasons, is well known. The best known nonnutritive sweeteners are the saccharines, cyclamates, and most recently certain nutritive sweeteners examples of which are the dipeptide sweeteners such as lower alkyl esters of aspartyl phenylalanine and their edible salts.

All of the above groups of substances are appreciably sweeter than sucrose and have a low caloric content. However, the saccharines and cyclamates suffer from the disadvantages of leaving a bitter aftertaste in the mouth of the user. Attempts have been made to overcome this objectionable characteristic by combining these non-nutritive sweeteners with certain blocking and/or flavoring agents such as ribonucleosides, ribonucleotides, sodium chloride, d-galactose, tryptophans and the like.

The sweet-tart synergism long known in the art to exist in honey is now known to exist in the combination of potassium bitartrate and saccharine as taught in the January - February, 1972 issue of *American Scientist*, vol. 60, p. 45. However, although the sweetness level of the sweetener is purportedly increased, no evidence is given as to whether the problem of a lingering bitter aftertaste is at the same time alleviated.

Some sweeteners particularly the dipeptides do not demonstrate the bitter flavor notes of, for example, saccharine or cyclamate, but rather impart a lingering sweet aftertaste to the mouth of the user. Although it has not been determined how the known blocking and flavoring agents function in terms of bitterness reduction in the aforementioned non-nutritive sweeteners, it has been determined that their effect is minimal considering the concentrations that need be employed. In addition, blocking agents such as d-galactose and certain tryptophans impart their own characteristic sweetness which is not desirable where you otherwise have a pleasantly sweet compound. Therefore, use of the blocking and/or flavoring agents now known in the art with dipeptide sweeteners is undesirable.

Ideally, a taste modifier which has the ability to reduce the duration of sweetness without, at the same time, imparting an added sweetness and which is effective at moderately low levels would introduce improved sweeteners to the low-calorie sweetener market. This invention affords a method of effecting the same by combining a sweetener having characteristic delayed sweetness with an effective amount of aluminum potassium sulfate, Naringin or a combination thereof.

SUMMARY OF THE INVENTION

It has been found that it is possible to control the duration of sweetening effects of lingeringly sweet low-calorie sweeteners such as dipeptide sweeteners and their salts. More specifically, when aluminum potassium sulfate, Naringin or a mixture of these compounds is added to such sweeteners as for example, L-aspartyl-L-phenylalanine methyl ester, hereinafter referred to as APM, in an amount effective to modify such aftertaste, or is employed in foodstuffs including beverages having a pH of about 5 or higher and containing such sweeteners, the sweet aftertaste characteristic of these sweeteners is eliminated. The foodstuffs should preferably have a pH of no less than about 5 due to the acid character of the flavor modifiers of this invention. Consequently their use in a primarily acid system would mask the sweetness of the dipeptide due to the high acid content. However, when these acidic taste modifiers are employed in a beverage which is nearly neutral to alkaline in pH, the acidity of the taste modifier and the basidity of the beverage neutralize the system so that the sweetness can more readily be observed.

Aluminum potassium sulfate hereinafter referred to as alum, and Naringin, otherwise known as 4', 5, 7-trihydroxyflavanone 7-rhammoglucoside have been found to exhibit unique flavor modifying properties and it is this new use which serves to benefit the sweetener market. Since the flavor modifiers of this invention have a unique "puckering" effect on the mouth of the user when sampled alone, it is felt that this property in effect reduces the lingering sweetness by in fact altering the manner in which the sweetness of the dipeptide is physiologically perceived.

The astringent properties of both of these compounds prevent their use in bulking agent quantities but they can be used in minor amounts with both nutritive and non-nutritive sweeteners having a lingering sweet aftertaste and known bulking agents to provide for example, a bulked table sweetener devoid of lingering sweet aftertaste and low in calories. In addition, synergistic sweetening compositions devoid of persisting sweetness and which may be used in virtually any liquid or solid foodstuff may be formulated by combining alum, Naringin or both with a dipeptide and other sweeteners known to enhance the sweetening potency of the dipeptide; for example, saccharine, the soluble salts thereof, and/or the cyclamates to mention just a few. Still further, alum and/or Naringin may be combined with the subject non-nutritive sweeteners and sucrose to provide a sweetening composition devoid of lingering aftertaste but with a higher calorie content.

It is therefore the principal object of this invention to provide sweeteners which are devoid of undesirable lingering sweet aftertaste.

It is another object of the present invention to provide a process for reducing or eliminating the persistant sweet aftertaste of these sweeteners without reducing the initial flavor impact by combining alum or Naringin with the same sweeteners in amounts effective to modify the lingering sweet aftertaste of the same.

It is yet another object of the present invention to provide products in which the lingering sweet aftertaste of these sweeteners has been thus reduced or eliminated.

The sweeteners to which the present invention is applicable comprise both nutritive and non-nutritive sweeteners particularly the dipeptides where lingering sweet aftertaste is evident.

These and other objects and features of the invention will be apparent from the consideration of the following detailed description of the invention taken in conjunction with the accompanying examples and the appended claims.

DESCRIPTION OF THE INVENTION

Broadly, the present invention concerns a sweetening composition comprising alum, Naringin or a combination thereof present in effective amounts to modify the lingering sweet aftertaste of sweeteners demonstrating such properties.

Germane to this class of sweeteners are the nutritive dipeptide sweeteners such as L-aspartyl-L-phenylalanine methyl ester. It is intended herein that any non-toxic or pharmaceutically acceptable salt of the dipeptide may also be used in the practice of this invention. Therefore, reference to dipeptide sweeteners will henceforth be intended to include such salts. The dipeptide sweeteners are the preferred sweeteners of this invention since their only organoleptic drawback is a lingering sweet aftertaste as compared to for example, saccharine or the soluble salts thereof which have an accompanying bitter aftertaste. Hence, addition of alum or Naringin to dipeptide sweeteners preferably L-aspartyl-L-phenylalanine methyl ester or foodstuffs containing the same results in a sweetening composition or dipeptide sweetened food product devoid of any tarrying aftertaste whatsoever attributable to the dipeptide.

Naringin is a bitter extract naturally occurring in the flowers of grapefruit trees, grapefruit peel, and in other types of fruit and rind. Due to the fact that large quantities of fruit and rind are required to obtain an appreciable amount of Naringin, use of this compound alone as a taste modifier would involve considerable expense. Consequently, the combination of alum with dipeptide sweeteners such as L-aspartyl-L-phenylalanine methyl ester is the preferred embodiment of this invention.

In accordance with one embodiment of the invention, the sweetening composition of the present invention, preferably alum and APM, can be combined with a solid pharmaceutical carrier and compressed into tablet form. Any of the customarily employed fillers and adjuvants such as dextrins and whey solids of high bulk and low density, lactose and starch can be added as a bulking agent, inert extender or carrier. In addition, it may be desirable to include mixtures of carbonates and organic acids in the manner well known in the art.

In accordance with another modification of the present invention, the sweetening composition comprised of alum and a lingeringly sweet sweetener, preferably a dipeptide sweetener such as L-aspartyl-L-phenylalanine methyl ester or a combination of the same with other sweeteners such as sugar, saccharine and/or cyclamate can be combined with a conventional bulking agent such as for example lactose, polyglucose, polymaltose, a polymaltodextrin or starch and blended into granulated form or co-dried as by drum-drying to produce the desired crystalline appearance. Preferably, the dry granulated composition will have a sweetening power approximately equivalent to sucrose on a volume basis.

In conformity with still another embodiment of this invention, the sweetener/alum sweetening composition may be incorporated into a moderately acidic to alkaline dry, carbonated or non-carbonated beverage to provide a final beverage product of desirable sweetness intensity without an accompanying sweet aftertaste.

The sweetening composition of the present invention can also be extended with water or other edible liquid systems such as edible polyhydric alcohols in which alum is soluble e.g. glycerol, or edible oils for use as a liquid sweetener, coating material or the like.

It should be noted that the components of the sweetening composition of this invention must be in combination in order to achieve the desired results. Thus, while specific modifications of this invention have been stipulated in terms of combining alum with the sweetener, it is not wished that the scope of this invention be restricted to the same. Hence, any suitable method of combining or preferably complexing the components of the sweetening composition of this invention which should be obvious to those skilled in the art may be utilized. Hence, when speaking in terms of combining the sweetener with alum outside the context of addition to a foodstuff in order to derive a composition comprised essentially of these ingredients, dry blending, co-drying a solution containing the sweetener and alum, as by drum drying, spray drying, freeze-drying or the like, agglomeration or any additional known methods and modifications thereof are intended for inclusion within this invention. Similarly, when speaking in terms of employing the sweetening compositions of this invention in a foodstuff, it should be obvious to those skilled in the art that numerous methods are available to bring about such a combination, preferably taking into consideration the type of product and process to which the product may be subjected. Thus, while the sweetener and alum may be combined prior to addition to the foodstuff or added concurrently or intermittently thereto, there will be some instances particularly when dipeptide sweeteners are employed, where it will be preferred that the sweetener either alone or in combination with alum be added to the foodstuff after the foodstuff has been either partially or completely processed. Thus, for example, where the particular product is to be subjected to increased temperatures, e.g. above 100°C, and where dipeptide sweeteners are to be employed it may be desirable to add the same to the product after such heat processing due the sensitivity of these dipeptides to thermal degradation.

The modified sweetener of the present invention can be used in beverages, breakfast drinks, syrups, candies, cereals, desserts such as puddings, gelatin, and in virtually any dry, semi-moist or moist foodstuff preferably having a pH of no lower than about 5 and in which a non-lingeringly sweet taste is desired.

The following examples are given to further illustrate the present invention. The scope of the invention is not, however meant to be limited to the specific details of the example.

EXAMPLE I

A puffed cereal product is pre-sweetened with L-aspartyl-L-phenylalanine methyl ester (APM) in the following two-step method.

A corn syrup system is prepared which contains:

| | |
|---|---|
| Corn Syrup (42 DE) | 56% |
| Morrex (10 DE) | 18% |
| Water | 26% |

This syrup is homogenously mixed using a magnetic stirrer and thereafter sprayed onto the puffed cereal product at a ratio of one part syrup to one part cereal.

---

An APM oil system containing:
Safflower Oil                                 81.810

| | |
|---|---|
| APM | 13.428 |
| Aluminum Potassium Sulfate | 4.762 | is mixed to form a homogenous oil system. This APM oil system is sprayed onto the pre-coated puffed cereal at a ratio of 97.7 g cereal to 2.3 g APM solution to give a final concentration of 60% cereal, 26.86% corn syrup, 10.84% Morrex, 1.88% safflower oil, 0.31% APM and 0.11% alum.

The resulting cereal product has an initial burst of sweetness when consumed but does not demonstrate any lingering sweet aftertaste in the mouth of the user.

What is claimed is:

1. A modified sweetening composition which comprises a dipeptide sweetener and a minor amount of a taste modifier selected from the group consisting of aluminum potassium sulfate, Naringin and mixtures thereof effective to modify the lingering sweet aftertaste of the dipeptide sweetener.

2. The composition of claim 1 wherein the taste modifier is aluminum potassium sulfate.

3. The composition as recited in claim 1 wherein the dipeptide is L-aspartyl-L-phenylalanine methyl ester.

4. The composition as recited in claim 3 wherein L-aspartyl-L-phenylalanine methyl ester is combined with other sweeteners.

5. The composition as recited in claim 4 wherein the other sweetener is a saccharine.

6. The composition as recited in claim 4 wherein the other sweetener is a cyclamate.

7. The composition as recited in claim 4 wherein the other sweetener is sucrose.

8. A method of modifying the lingering sweet aftertaste of dipeptide sweeteners demonstrating such aftertaste which comprises combining the dipeptide sweetener with a minor amount of a taste modifier selected from the group consisting of aluminum potassium sulfate, Naringin and mixtures thereof effective to modify the lingering sweet aftertaste of the dipeptide sweetener.

9. The method of claim 8 wherein the taste modifier is aluminum potassium sulfate.

10. The method as recited in claim 9 wherein the dipeptide is L-aspartyl-L-phenylalanine methyl ester.

11. A dipeptide sweetened foodstuff which is devoid of any lingering sweet aftertaste which comprises in combination a foodstuff, a dipeptide sweetener and a minor amount of a taste modifier selected from the group consisting of aluminum potassium sulfate, Naringin, and a mixture thereof effective to modify the lingering sweet aftertaste of the dipeptide.

12. The foodstuff of claim 11 wherein the taste modifier is aluminum potassium sulfate.

13. The foodstuff as recited in claim 11 wherein the dipeptide is L-aspartyl-L-phenylalanine methyl ester.

14. The foodstuff as recited in claim 13 wherein the foodstuff is a cereal.

15. The foodstuff as recited in claim 13 wherein the foodstuff is a beverage.

16. The foodstuff as recited in claim 11 wherein the dipeptide is combined with other sweeteners.

17. The foodstuff of claim 16 wherein the other sweetener is a saccharine.

18. The foodstuff of claim 16 wherein the other sweetener is a cyclamate.

19. The foodstuff of claim 16 wherein the other sweetener is sucrose.

20. The foodstuff as recited in claim 11 wherein the sweetener and the taste modifier are added concurrently to the foodstuff.

21. The foodstuff as recited in claim 11 wherein the sweetener and the taste modifier are added intermittently to the foodstuff.

* * * * *